G. A. KRAMER.
LUBRICANT LEAKAGE PREVENTING DEVICE FOR COMPRESSORS.
APPLICATION FILED JAN. 7, 1919.
1,345,372.
Patented July 6, 1920.
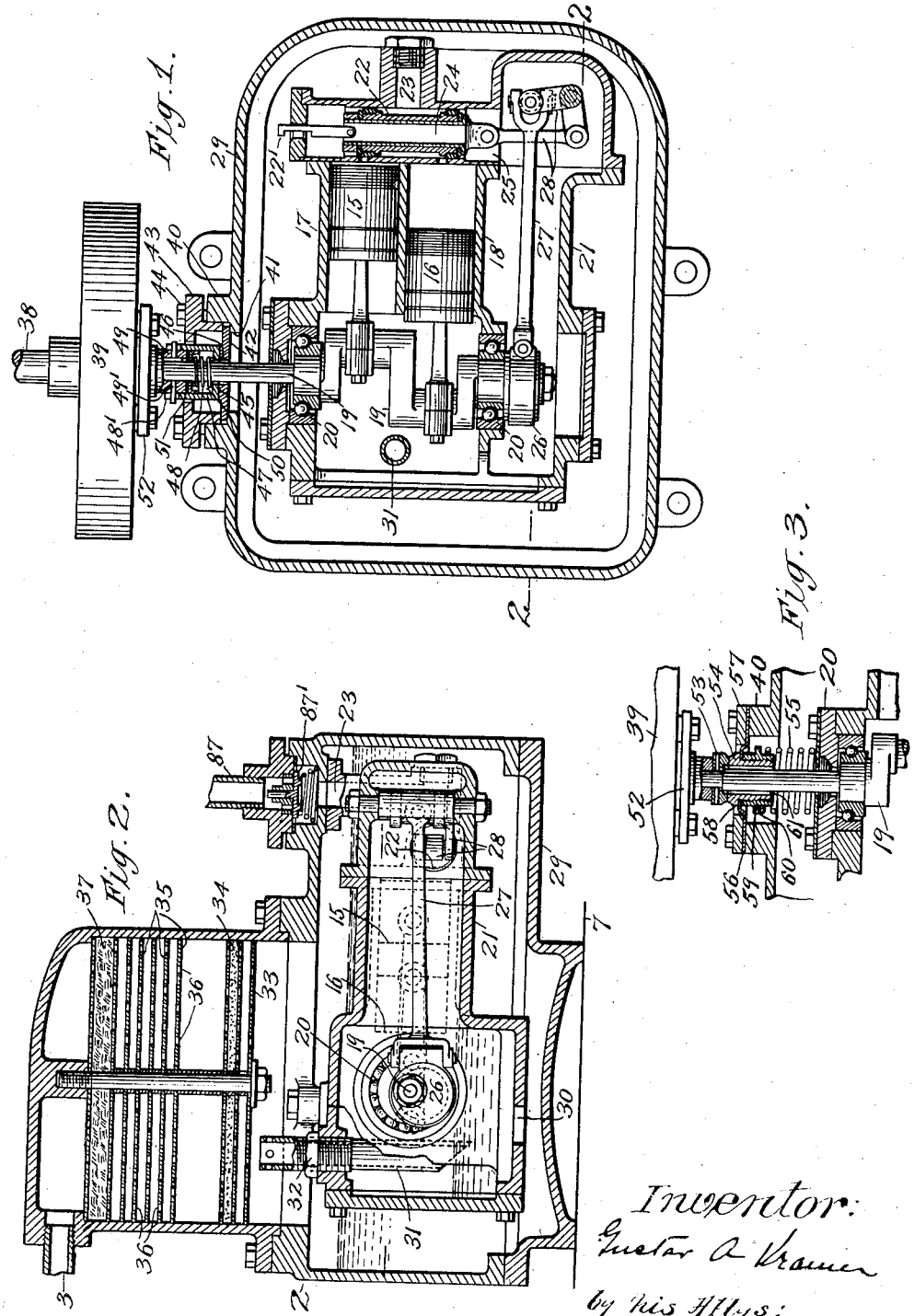

UNITED STATES PATENT OFFICE.

GUSTAV A. KRAMER, OF NEW YORK, N. Y., ASSIGNOR, BY MESNE ASSIGNMENTS, TO BALSA REFRIGERATOR CORPORATION, OF NEW YORK, N. Y., A CORPORATION OF NEW YORK.

LUBRICANT-LEAKAGE-PREVENTING DEVICE FOR COMPRESSORS.

1,345,372.  Specification of Letters Patent.  Patented July 6, 1920.

Original application filed January 4, 1917, Serial No. 140,509. Divided and this application filed January 7, 1919. Serial No. 270,015.

*To all whom it may concern:*

Be it known that I, GUSTAV A. KRAMER, a subject of the King of Hungary, now residing at New York city, county of New York, and State of New York, have invented certain new and useful Improvements in Lubricant-Leakage-Preventing Devices for Compressors, fully described and represented in the following specification and the accompanying drawings, forming a part of the same.

This invention relates to certain improvements in high speed compressors, and the invention has for its special object the production of a high speed compressor which will be self-oiling under varying load conditions, and in which escape of lubricant from the compressor is prevented, so that the compressor will operate automatically without attention for long periods, such a compressor having been particularly designed for use in automatic refrigerating systems of the household type, such as shown and described in my co-pending application Serial No. 140,509, filed January 4, 1917, now Patent No. 1,281,027, of which application the present case is a division. The improved compressor and improved means employed for preventing escape of lubricant therefrom is shown in the accompanying drawings and will now be described fully in connection therewith. In these drawings—

Figure 1 is a plan view partly in section illustrating the compressor and a connection from the compressor to its prime mover, through which the compressor is driven, and escape of lubricant from the compressor prevented;

Fig. 2 is a cross section taken on line 2—2 of Fig. 1 showing the arrangement of compressor parts, and Fig. 3 is a detail sectional view on a somewhat enlarged scale, showing a modification in the connection from the compressor to its prime mover for preventing escape of lubricant.

In high speed air compressors or pumps of a type which will be automatic and not require attention for long periods, such as are particularly desirable in automatic refrigerating systems, difficulty has been experienced in properly cooling the compressor. In such compressors, furthermore, where the lubrication of the compressor must be automatic for long periods, it is necessary that there be supplied an amount of lubricant greatly in excess of that actually required for the lubrication of the compressor, and there has been great difficulty in providing suitable connections between the compressor and its prime mover which shall prevent escape and a consequent loss of lubricant, particularly where, as in refrigerating systems, the compressors must operate under varying load conditions.

In the drawings are illustrated constructions for overcoming these difficulties and providing a high speed compressor which will be self-oiling and automatic for long periods. As shown, the compressor is a two-cylinder pump having pistons 15, 16 working in cylinders 17, 18 operated from a crank shaft 19 mounted in suitable ball bearings 20 in the crank case 21. A piston valve 22 controls the passage of the vapor to be compressed from an inlet 23 to the cylinders, and the compressed vapor from the upper cylinder 17 shown in Fig. 1, passes through a passage 24 in the valve to and through a passage 25, and the compressed vapor from the lower cylinder 18 passes directly through passage 25 into casing 21, the vapors being thus directed for a purpose hereinafter referred to. The valve 22 may, if desired, be oiled in any suitable manner, as by a hook-shaped member 22' which acts to draw oil into the valve casing. This valve is operated in any suitable manner, as by eccentric 26, rod 27, and links 28.

As before stated, a supply of lubricant is provided for lubricating the compressor which is greatly in excess of that actually needed for lubricating purposes, this excess of lubricant serving to make the apparatus automatic for long periods, and further, this excess of lubricant is utilized for assisting in cooling the compressor. The particular construction used for this purpose may be varied, but as illustrated the crank case of the compressor is carried in a housing 29 which is suitably mounted on a support 7. This housing is of sufficient dimensions to hold the desired excess of lubricant, and the lubricant has a free circulation around this housing and through the crank case of the compressor, entering the crank case of the compressor through a suitable opening or port such as that marked 30 in Fig. 2.

This arrangement permits an excess of lubricant and, at the same time, by the lubricant circulating through the crank case and through the housing the heat generated by the compressor is, through the liquid, transferred to the housing which, having a much larger surface, can be more effectively cooled by the air current generated by a fan or other medium.

The compressed gas, as before stated, passes from the piston valve through the crank casing and leaves the crank casing through a suitable channel which may be, as shown, a pipe 31 which is adjustably mounted as shown at 32 in the crank casing. This pipe is dimensioned so that the end of the pipe will project into the crank casing to a level at which it is desired to keep the lubricant in the casing during the operation of the compressor, the compressed vapors passing through the crank casing holding the lubricant and escaping from the casing above the level of the lubricant through the pipe, and acting to keep the lubricant in the crank casing at the desired predetermined level.

The compressor is driven, as before stated, from any suitable prime mover, as an electric motor, through shaft 38 and fly wheel 39. It is necessary in the construction described, in which the lubricant is carried in a housing, that the connections between the motor shaft and the crank shaft of the compressor be such that leakage of the lubricant around the connection shall be reduced to a required minimum, so that there shall not be any substantial loss of lubricant. Various constructions may be employed for this purpose, but a stuffing gland of novel construction is shown in the drawings which has been found to be very efficient in practice, and which forms one of the chief features of the invention. In the construction illustrated, referring first to Fig. 1, the housing 29, before referred to, is provided with a boss 40 formed with an interior seat 41. On this seat 41 is a disk or plate 42 which is held against the seat so as to be liquid-tight by a flanged holder ring secured in place by bolts 44. The central portion of the disk 42 is slightly raised, as shown at 45, and this portion of the disk is finely polished. The disk is provided with a central perforation through which the end of the crank shaft 19 passes, a very slight clearance opening 46 being left about the shaft. Co-operating with this disk 42 is a hollow runner or traveler 47. This runner 47 has its lower face highly polished so as to have a close fit with the polished face 45 of the disk 42, which shall be substantially liquid-tight, a very small amount of liquid being permitted to pass between these plates for the purpose of lubricating. This amount of liquid is determined by a spring 48 which presses the two polished surfaces against each other and permits only sufficient lubricant to enter between them as will suffice for their lubrication.

As the pressure of the lubricant varies in the crank case during the operation of the apparatus, and as the spring must not be of such strength as to hold the plates in liquid-tight relation with each other at the highest occurring pressure of the lubricant, means are provided for assisting the spring in holding the surfaces together. While these means may vary somewhat, the pressure of the lubricant is utilized for this purpose. While the specific means may vary somewhat, in the construction illustrated in Fig. 1 the hollow runner 47 is closed at one end by a plug 49 fast on the shaft 19, before referred to, a lubricant chamber 50 being formed between the plug and the bottom of the runner. This chamber at its upper part is rendered liquid-tight by a cup washer 51. The runner 47 is slotted at its upper end, as indicated at 48', and through the slots passes a pin 49', this pin also passing through the plug 49, thus putting the runner in contact with the plug and at the same time permitting a slight sliding movement of the plug, so that the spring will always hold the runner in suitable contact with the plate or disk 45, before referred to. With this construction, the lubricant under high pressure can pass through the clearances 46 in the plate and runner and thus enter the liquid chamber 50 in the runner and add its pressure to the pressure of the spring and hold the two surfaces in the required liquid-tight relation with each other.

The crank shaft 19 and motor shaft 18 are coupled together by any suitable coupling, a coupling 52 being indicated in Fig. 1.

With the construction as thus far described an ample supply of lubricant is provided, the heat of the compressor is diffused so that it may be more effectively cooled by suitable cooling means, and, furthermore, the compressor being sealed by the liquid in the housing, all of its joints are tight and danger of loss of compressed vapor as refrigerant, for instance, is reduced to a minimum, as long as the glands are tight and the lubricant-level is maintained above the glands.

In Fig. 3 is illustrated a modification embodying the principle of the stuffing gland just previously described and shown in Fig. 1. The specific construction shown in Fig. 3, however, is somewhat different from that shown in Fig. 1, and will now be described.

In the construction shown in this figure, the crank shaft 19 has fast thereon and turning therewith a fixed collar or nut 53, which has a highly polished lower surface. Coöperating with this collar or nut 53 is a runner nut or bushing 54 slidable on the crank shaft 19. This bushing 54 is backed by a spring 55, which takes against the bearing 20 of the crank case before referred to. This spring 55 performs the same function as the spring 48, before referred to in the description of the gland shown in Fig. 1. As the pressure increases during the operation of the apparatus, as heretofore explained, means are provided to assist the spring 55 in holding the polished surfaces of the nut and bushing in such close contact as only to permit the desired amount of lubricant to enter between the surfaces. In the construction shown for effecting this in the modification of Fig. 3, the bushing is yieldingly supported by means of a liquid-tight flexible diaphragm 56 clamped between the boss 40 and a top plate 57, the diaphragm at its inner edges taking against a shoulder 58 in the bushing and being clamped at that point against the shoulder by a nut 59. This nut 59 in the particular construction illustrated forms one abutment for the spring 55, being provided with a flange 60 for this purpose. The lubricant is admitted from the housing to the polished surfaces by means of a narrow passage 61 around the crank shaft.

While the invention is shown and described in its preferred form, it will be understood that various changes may be made in the specific constructions illustrated and described for effecting the objects of the invention.

What is claimed is:

1. The combination of a fluid containing chamber, a shaft extending through a wall thereof, a stuffing gland including a member fixed relatively to the shaft and a member movable relatively thereto, said members having coöperating rigid fluid-tight faces, means for holding the members in fluid-tight relation under normal fluid pressure, and separate means for assisting the holding means under increased fluid pressure.

2. The combination of a fluid containing chamber, a shaft extending through a wall thereof, a stuffing gland including a member fixed relatively to the shaft and a member movable relatively thereto, said members having coöperating rigid fluid-tight faces, and a spring for holding the members in fluid-tight relation under normal fluid pressure, and separate connections whereby increased fluid pressure would actuate the movable member to assist the spring in holding the members in fluid-tight relation.

3. The combination of a fluid containing chamber, a shaft extending through a wall thereof, a member fixed relatively to the shaft and a member movable along the shaft, said members having coöperating rigid fluid-tight faces, a spring actuating the sliding member to bring it into fluid-tight contact with the fixed member under normal fluid pressure, and means whereby increase of pressure would also actuate the movable member to assist the spring in holding the members in fluid-tight relation.

4. The combination with a chamber containing fluid subjected to varying working pressures, a rotary shaft extending through the wall thereof, a stuffing gland including a member fixed to the shaft and a member slidable on the shaft, the adjacent faces of these members being fluid-tight, a spring adjusted to force the movable member into fluid-tight contact with the fixed member under normal fluid pressure, and a flexible diaphragm for additionally forcing the movable member into fluid-tight contact with the fixed member under increasing fluid pressure.

In testimony whereof I have hereunto set my hand.

GUSTAV A. KRAMER.